(12) United States Patent
Barfield, Jr. et al.

(10) Patent No.: US 9,718,468 B2
(45) Date of Patent: Aug. 1, 2017

(54) COLLISION PREDICTION SYSTEM

(71) Applicant: Verizon Patent and Licensing Inc., Basking Ridge, NJ (US)

(72) Inventors: James Ronald Barfield, Jr., Atlanta, GA (US); Stephen Christopher Welch, Atlanta, GA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 101 days.

(21) Appl. No.: 14/881,398

(22) Filed: Oct. 13, 2015

(65) Prior Publication Data

US 2017/0101093 A1    Apr. 13, 2017

(51) Int. Cl.
*B60W 30/095* (2012.01)
*B60W 30/09* (2012.01)
*B60W 50/14* (2012.01)
*B60W 50/00* (2006.01)
*G08G 1/16* (2006.01)

(52) U.S. Cl.
CPC .......... *B60W 30/095* (2013.01); *B60W 30/09* (2013.01); *B60W 50/0097* (2013.01); *B60W 50/14* (2013.01); *G08G 1/16* (2013.01); *B60W 2400/00* (2013.01); *B60W 2420/40* (2013.01); *B60W 2420/42* (2013.01); *B60W 2420/54* (2013.01); *B60W 2540/10* (2013.01); *B60W 2540/12* (2013.01); *B60W 2540/18* (2013.01); *B60W 2550/308* (2013.01); *B60W 2550/402* (2013.01); *B60W 2550/404* (2013.01)

(58) Field of Classification Search
CPC .... B60W 30/095; B60W 30/09; B60W 50/14; B60W 50/0097; B60W 2420/42; B60W 2400/00; B60W 2420/54; B60W 2420/40; B60W 2540/18; B60W 2540/10; B60W 2540/12; B60W 2550/308; B60W 2550/402; B60W 2550/404; G08G 1/16
See application file for complete search history.

(56) References Cited

U.S. PATENT DOCUMENTS

| 5,613,039 | A | * | 3/1997 | Wang | G01J 3/453 |
|---|---|---|---|---|---|
| | | | | | 342/70 |
| 2003/0191568 | A1 | * | 10/2003 | Breed | B60W 40/06 |
| | | | | | 701/36 |
| 2005/0060069 | A1 | * | 3/2005 | Breed | B60N 2/2863 |
| | | | | | 701/408 |
| 2005/0134440 | A1 | * | 6/2005 | Breed | B60N 2/2863 |
| | | | | | 340/435 |

(Continued)

*Primary Examiner* — Russell Frejd

(57) ABSTRACT

Information identifying one or more conditions associated with a vehicle is collected. This information may include first data associated with the vehicle, second data associated with a driver of the vehicle, and third data associated with an environment around the vehicle. The information may be collected from a vehicle sensor, a telematics unit, a user device associated with the driver or a passenger, or a remote server. A likelihood of a collision involving the vehicle, a likelihood of avoiding the collision, and a risk associated with the collision may be determined based on the collected data. An appropriate response may be selected based on the likelihood of the collision, the likelihood of avoiding the collision, and the risk associated with the collision.

20 Claims, 9 Drawing Sheets

(56) References Cited

U.S. PATENT DOCUMENTS

| | | | |
|---|---|---|---|
| 2007/0021915 A1* | 1/2007 | Breed | B60N 2/2863 701/301 |
| 2010/0169009 A1* | 7/2010 | Breed | B60N 2/2863 701/301 |
| 2015/0294422 A1* | 10/2015 | Carver | G06Q 40/08 705/4 |

* cited by examiner

COLLISION PREDICTION SYSTEM

BACKGROUND

A motorized vehicle, such as a bus, automobile, or motorcycle, may include one or more sensors to determine the proximity of the vehicle to an object or another vehicle. The vehicle may further include a collision avoidance system that modifies the operation of the vehicle to avoid a collision with a detected object or vehicle. For example, the collision avoidance system may cause the vehicle to stop, decelerate, accelerate, steer (e.g., change directions), or perform another action. In another example, a vehicle may include an adaptive cruise control (ACC) system that modifies the velocity of the vehicle based on the proximity of the vehicle to other moving vehicles.

DETAILED DESCRIPTION

The following detailed description refers to the accompanying drawings. The same reference numbers in different drawings may identify the same or similar elements.

Figure 1A:
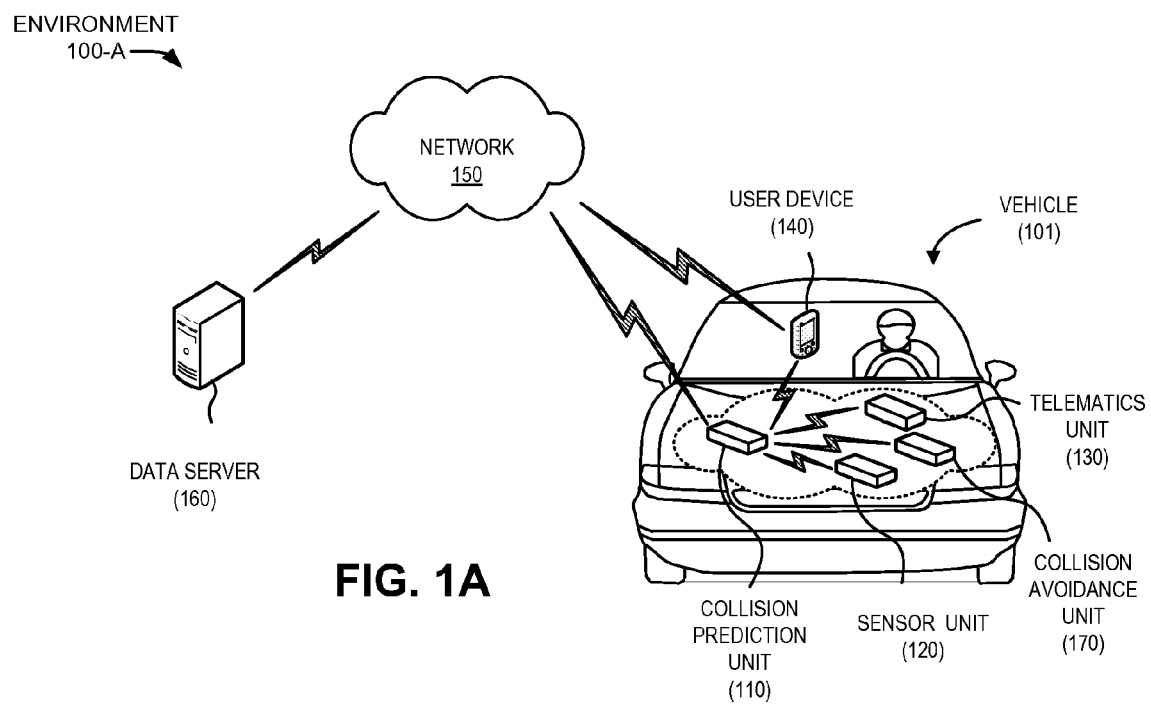
FIGS. 1A-1C depict an exemplary environment in which systems and/or methods described herein may be implemented.
Figure 1B:
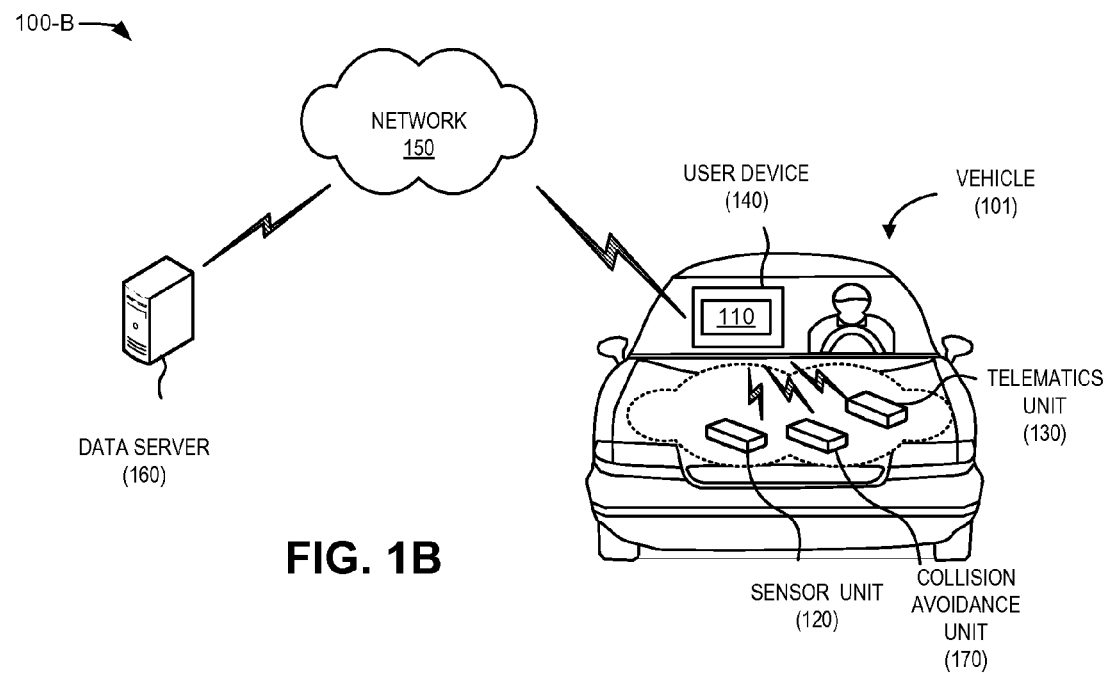
Figure 1C:
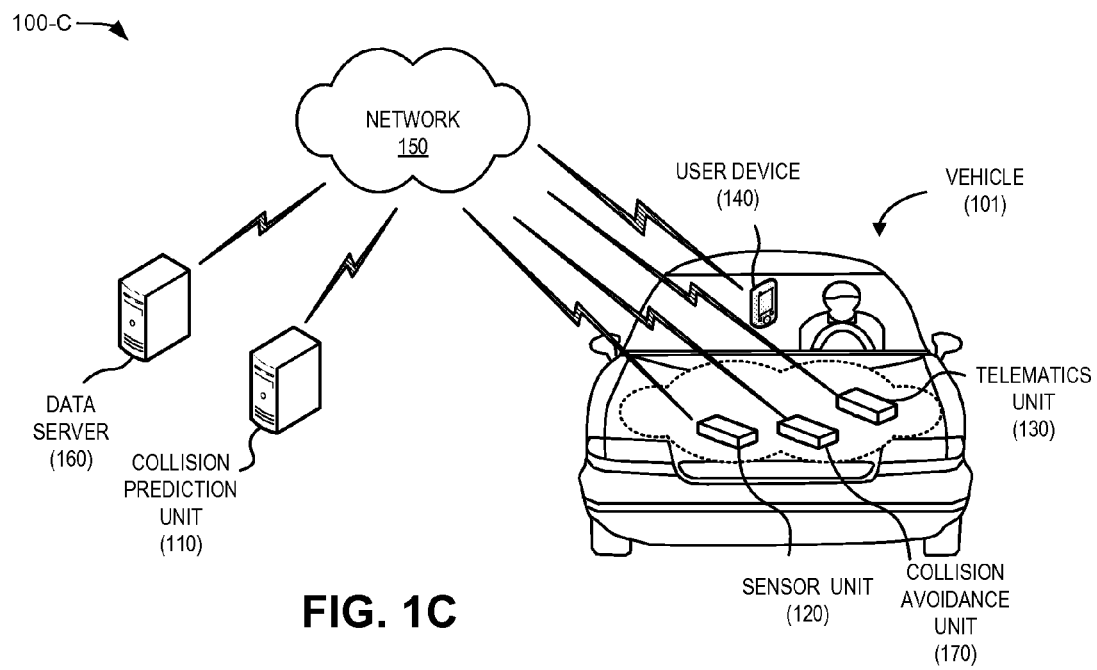

FIGS. 1A-1C show an exemplary environment 100 (shown in FIG. 1A as environment 100-A, in FIG. 1B as environment 100-B, and in FIG. 1C as environment 100-C) in which systems and/or methods described herein may be implemented. As illustrated in FIG. 1A, environment 100-A may include, for example, a vehicle 101 that includes a collision prediction unit 110, a sensor unit 120, a telematics unit 130, and a user device 140 that may communicate via a network 150 with a data server 160. Devices and/or networks of network environment 100 may interconnect via wired and/or wireless links.

Collision prediction unit 110 may collect and process various types of data to predict the likelihoods of possible collisions based on various conditions associated with vehicle 101. For example, collision prediction unit 110 may collect data regarding vehicle 101 (e.g., data about the condition of vehicle 101 and/or its operation), data regarding a driver of vehicle 101 (e.g., an experience of the driver), and/or data regarding an environment around vehicle 101 (e.g., weather conditions, road conditions, etc.). Types of data collected and processed by collision prediction unit 110 and the processing of this data are described in greater detail below.

In various embodiments, collision prediction unit 110 may collect data from various sources, such as sensor unit 120, telematics unit 130, user device(s) 140 and/or data server 160. For example, collision prediction unit 110 may communicate via a local wireless network [not shown] with sensor unit 120, telematics unit 130, and/or user device 140 and/or may connect to data server 160 via network 150 to collect information regarding a driver, vehicle 101, road conditions, etc. In another example, user device 140 may collect data from data server 160 via network 150, and user device 140 may forward the collected data to collision prediction unit 110 via the local wireless network. Collision prediction unit 110 may communicate with sensor unit 120, telematics unit 130, and/or user device 140 over the local wireless network in accordance with one or more communication standards. For example, collision prediction unit 110 may employ, for example, Institute of Electrical and Electronics Engineers (IEEE) 802.15 (e.g., Bluetooth®) communications protocols or IEEE 802.11 wireless networking protocols (e.g., Wi-Fi®). In another example, collision prediction unit 110 may be connected by a physical wire or cable to one or more other components, such as sensor unit 120, telematics unit 130, user device 140, and/or collision avoidance unit 170.

In one implementation, collision prediction unit 110 may provide an interface, such as a web page form, to receive data from a user (e.g., via a input device). For example, collision prediction unit 110 may provide an entry point for secure web portal. Additionally or alternatively, collision prediction unit 110 may provide a web-based application that user device 140 may use to submit data associated with, for example, a driver, road conditions, a condition of vehicle 101, an environmental condition, etc. In another implementation, the web-based application may include a utility module to automatically collect information from user device 140, such as contact information identifying attributes of the driver.

Collision prediction unit 110 may determine the statistical effects of various conditions on a likelihood of a collision. To determine the likelihood of a collision, collision prediction unit 110 may identify various conditions (e.g., conditions associated with vehicle 101 during a time period) and collision prediction unit 110 determine an expected effect of the identified conditions on the likelihood of a collision. For example, collision prediction unit 110 may determine that the risk of a collision is relatively high if collision prediction unit 110 determines that vehicle 101 is being operated at an excessive speed by an inexperienced driver and is approaching a portion of a road that has a high historical accident rate (e.g., the road includes a curve and loose gravel). Collision prediction unit 110 may further modify the determined risk of a collision based on other factors, such as the condition of vehicle 101 (e.g., whether vehicle 101 is properly serviced), whether other vehicles are present in the approaching section of road, environmental conditions such the presence of ice (e.g., the outside temperature is below freezing) or low light conditions (e.g., vehicle 101 is being driven in overcast conditions and/or at night time), etc.

In certain implementations, collision prediction unit 110 may provide information regarding the likelihoods of collision to collision avoidance unit 170. Collision prediction unit 110 may further provide data regarding different possible actions (e.g., to slow down, stop, and/or steer vehicle 101) and the effects of the different actions on the likelihood of collision. Additionally or alternatively, collision prediction unit 110 may provide recommendations to collision avoidance unit 170. For example, collision prediction unit 110 may determine the expected likelihoods of collision associated with different actions, and may identify a "best" response based on the likelihoods of collision. For example, the best response may correspond to an action that minimizes the likelihood of collision. Collision avoidance unit 170 may then implement one or more of the actions based on the data received from collision prediction unit 110.

Although shown as a component of vehicle 101, it should be appreciated that collision prediction unit 110 may be a component of another device and/or may be located remotely from vehicle 101. For example, a collision prediction unit 110 located in or otherwise associated with vehicle 101 may provide a warning to another vehicle if collision prediction unit 110 determines that the other vehicle is likely to be involved in a collision (e.g., the other vehicle is being operated in an unsafe manner). For instance, collision prediction unit 110 may report the unsafe driving of the other vehicle to data server 160, and data server 160 use information forwarded by collision prediction unit 110 to identify the other vehicle. Data server 160 may identify the other vehicle based on, for example, attributes of the other vehicle (vehicle speed, location, travelling direction, vehicle type, etc.) collected by collision prediction unit 110, image data or other sensor data collected by sensor unit 120 and forwarded by collision prediction unit 110, etc. Data server 160 may then forward a warning to a user device 140 associated with a driver of the other vehicle and/or to another collision prediction unit 110 associated with the other vehicle.

In an example shown in FIG. 1B, collision prediction unit 110 may be included as a component of or otherwise implemented by user device 140. For example, user device 140 may collect data directly (e.g., via an input device and/or a sensor) or may collect data from sensor unit 120, telematics unit 130, and/or data server 160. For example, user device 140 may collect information regarding vehicle 101 and/or a surrounding environment.

In another example shown in FIG. 1C, collision prediction unit 110 may be positioned remotely from vehicle 101. For example, collision prediction unit 110 may communicate via network 150 to receive data from sensor unit 120, telematics unit 130, user device 140, and/or data server 160. Collision prediction unit 110 may forward data regarding a collision probability analysis (based on collected data) to user device 140, and user device 140 may present the data and/or may interface with collision avoidance unit 170 to modify the operation of vehicle 101 based on the collision probability analysis. In one example, collision prediction unit 110 may process data regarding multiple vehicles 101, such as interfacing with sensor units 120, telematics units 130, user devices 140, data server, and/or collision avoidance unit 170 associated with multiple vehicles 101.

As shown in FIGS. 1A-1C, environment 100 may further include sensor unit 120. Sensor unit 120 may include one or more devices for collecting information regarding the environment associated with vehicle 101. For example, sensor unit 120 may include a compass, a gyroscope, accelerometer, etc. to identify a motion associated with vehicle 101. In another example, sensor unit 120 may include one or more environmental sensors such as a thermometer to identify a temperature, a barometer to identify an air pressure, a hydrometer to identify moisture levels, a light meter to identify light conditions, a microphone to identify sound conditions, etc. In yet another example, sensor unit 120 may include a proximity detection system, such as a laser or radar-based system that emits radio-frequency (RF) radiation and detects the presence of an object or other vehicle based on reflected portions of the emitted RF radiation. Additionally or alternatively, sensor unit 120 may detect an attribute of the driver. For example, sensor unit 120 may include a biometric sensor to identify a body temperature, eye trackers to determine the driver's awareness level, a chemical sensor to identify alcohol or other chemicals emitted by the driver, etc.

In still another example, sensor unit 120 may include a position determining mechanism to determine a geographic location associated with vehicle 200. For example, sensor unit 120 may include a sensor to receive a location signal from a global position system (GPS) or another location service, or sensor unit 120 may determine a location of vehicle 101 based on other factors, such as by processing attributes (e.g., signal strength, delays, etc.) of transmissions received from a communications network and/or a data network (e.g., network 150). Sensor unit 120 may determine additional information based on detected changes in the location of vehicle 101 (e.g., distances traveled by vehicle 101, a time that vehicle 101 is being operated, a velocity of vehicle 101, etc.).

Telematics unit 130 may include a data collection system configured for installation in vehicle 101. For example, telematics unit 130 may receive data generated by vehicle sensors and/or a vehicle electronic control unit (ECU). An ECU may transmit status and diagnostic information over a shared, standardized communication bus in the vehicle. The bus effectively functions as an on-board computer network, with many processors transmitting and receiving data via the bus. Data available from the ECU may include vehicle speed, fuel level, engine temperature, intake manifold pressure, etc. Telematics unit 130 may include a component for communicating over network 150. Telematics unit 130 may also be capable of communicating with collision prediction unit 110, sensor unit 120, user device 140 and/or collision avoidance unit 170 via a short-range wireless network, such as a wireless network implementing Bluetooth® or Wi-Fi® protocols.

User device 140 may include a personal communications system (PCS) terminal (e.g., that may combine a cellular radiotelephone with data processing and data communications capabilities), a wireless device, a smart phone, a tablet, a personal digital assistant (PDA) (e.g., that can include a radiotelephone, a pager, Internet/intranet access, etc.), a laptop computer (e.g., with a wireless air card), a global positioning system (GPS) device, a gaming device, a portable media player, a consumer electronics device, or other types of computational or communication devices. User device 140 may collect and forward, to collision prediction unit, information regarding the activities of the driver, such as an indication of whether the driver is engaged in conversation or using another function of user device 140.

In another example, user device 140 may include and/or communicate with one or more wearable devices that collect information regarding the driver, vehicle 101, and/or a surrounding environment. For example, a wearable device such as a smart watch or a fitness tracker may collect information regarding a movement of the driver and determine, for example, information regarding a health and/or activity level of the driver (e.g., whether the driver is conscious or distracted by another activity). In another example, a wearable device, such as smart glasses or a microphone, may collect information regarding sights and/or sounds in an environment around the driver. Another type of wearable device, such as a biochemical sensor, may detect a chemical emission associated with the driver. The information collected from one or more wearable devices may be used to determine an alertness level (or attention level) of the driver. The alertness/attention level may be determined at one or more of collision prediction unit 110, sensor unit 120, telematics unit 130, data service 160, or collision avoidance unit 170. The alertness/attention level may be used to generate a driver alertness/attention score/factor/rating, which may be used to determine a likelihood of a collision involving the vehicle, to determine a likelihood of avoiding the collision, or to determine a risk associated with the collision.

Network 150 may include a communications network that connects collision prediction unit 110, sensor unit 120, telematics unit 130, user device 140, and/or collision avoidance unit 170. Network 150 may include a local area network (LAN), a wide area network (WAN), a metropolitan area network (MAN), a wireless network, an optical fiber (or fiber optic) network, or a combination of networks. In one implementation, network 150 may include an IP-based network. In some implementations, network 150 may be a private network controlled by, for example, a telecommunications company that provides telephone and/or data access to collision prediction unit 110, sensor unit 120, telematics unit 130, user device 140, and/or collision avoidance unit 170. In another implementation, network 150 may be a public network, such as the Internet, or a combination of public and private networks.

Network 150 may include at least one radio network capable of supporting wireless communications to/from collision prediction unit 110, sensor unit 120, telematics unit 130, user device 140, and/or collision avoidance unit 170. The radio network may include, for example, a long-term evolution (LTE) network, another 3rd Generation Partnership Project (3GPP) 3G/4G network, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), enhanced high-rate packet data (eHRPD), or a network implemented in accordance with future wireless network standards.

In another implementation, network 150 may include, for example, one or more private Internet Protocol (IP) networks that use a private IP address space. In one implementation, network 150 may implement one or more virtual private networks (VPNs) for providing communication between devices within network 150. Network 150 may be protected/separated from other networks by a firewall (not shown). Although shown as a single element in FIGS. 1A-1C, network 150 may include a number of separate networks.

Data server 160 may gather, process, search, and/or provide information to collision prediction unit 110, sensor unit 120, telematics unit 130, user device 140, and/or collision avoidance unit 170. For example, data server 160 may collect data regarding surface conditions, traffic conditions, historical data regarding prior accidents, information regarding prior operation of vehicle 101 or other vehicles by the driver (e.g., the driver's prior accidents, citations, etc.). In one implementation, data server 160 may collect data regarding the operation of other vehicles, such as changes in motions, velocity, or other attributes of the other vehicles that may indicate, for example, collisions or near collisions, poor driving conditions, traffic, etc. occurring in a region being entered by vehicle 101. A "near collision" may include, for example, an event in which a vehicle is less than a threshold distance from another vehicle or object, more than certain amounts of deceleration and/or turning forces are detected, when the control of the vehicle is partially or totally taken from the driver, etc.

Collision avoidance unit 170 may perform one or more actions based on data received from collision prediction unit 110. For example, collision avoidance unit 170 may selectively change the operation of one or more components of vehicle 101, such as to change a velocity of vehicle 101 or even cause vehicle 101 to stop (e.g., by applying brakes, changing transmission gears, modifying levels of fuel supplied to an engine, etc.) or causing vehicle 101 to change directions (e.g., by changing steering settings, applying brakes to one or more wheels, applying engine power to one or more wheels, modifying suspension settings, etc.). Additionally or alternatively, collision avoidance unit 170 may provide a warning to a driver identifying a potential hazard and/or instructions for the driver to avoid an accident based on the potential hazard, such as identifying a safer alternative route. In yet another example, collision avoidance unit 170 may, if a collision is likely or otherwise unavoidable, perform actions to mitigate the effects of the collision. For example, collision avoidance unit 170 may cause vehicle 101 to decelerate as much as possible, prepare airbags, seatbelts, and/or other safety equipment for deployment in anticipation of the collisions, contact rescue officials, forward a warning to other vehicles that may be involved in the collision (e.g., to user device 140 located in the vehicles). When a collision may occur with several different objects and/or vehicles, collision avoidance unit 170 may direct vehicle 101 toward a "safest" one of the objects and/or vehicles (e.g., away from other moving vehicles, toward a least massive object, away from objects of inherent danger such as power lines, etc.).

In FIGS. 1A-1C, the particular arrangement and number of components of environment 100 are illustrated for simplicity. In practice, there may be more vehicle 101s, collision prediction units 110, sensor units 120, telematics units 130, user devices 140, networks 150, data servers 160, and/or collision avoidance units 170. Furthermore, functions described as being performed by a single component in environment 100 may be performed by multiple separate components, and functions described as being performed by multiple components in environment 100 may be performed by fewer components. For example, collision prediction unit 110 and telematics unit 130 may be included in a single component.

Figure 2A:
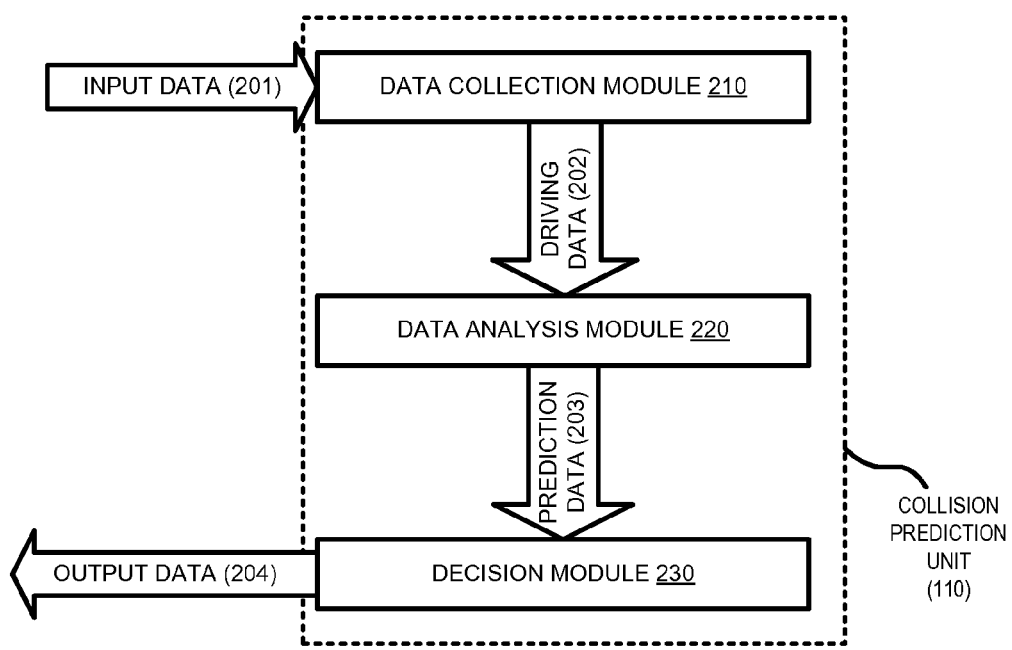
FIGS. 2A-2C depict exemplary components that may be included in the collision prediction unit included in the environment shown in FIGS. 1A-1C.
Figure 2B:
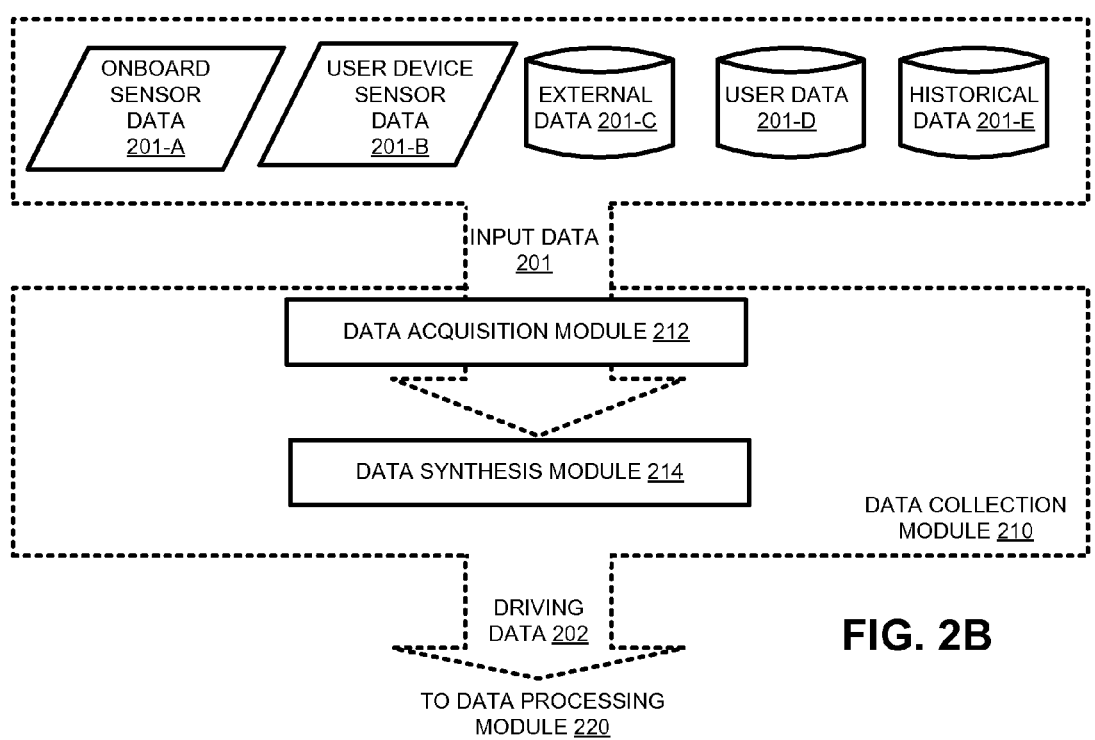
Figure 2C:
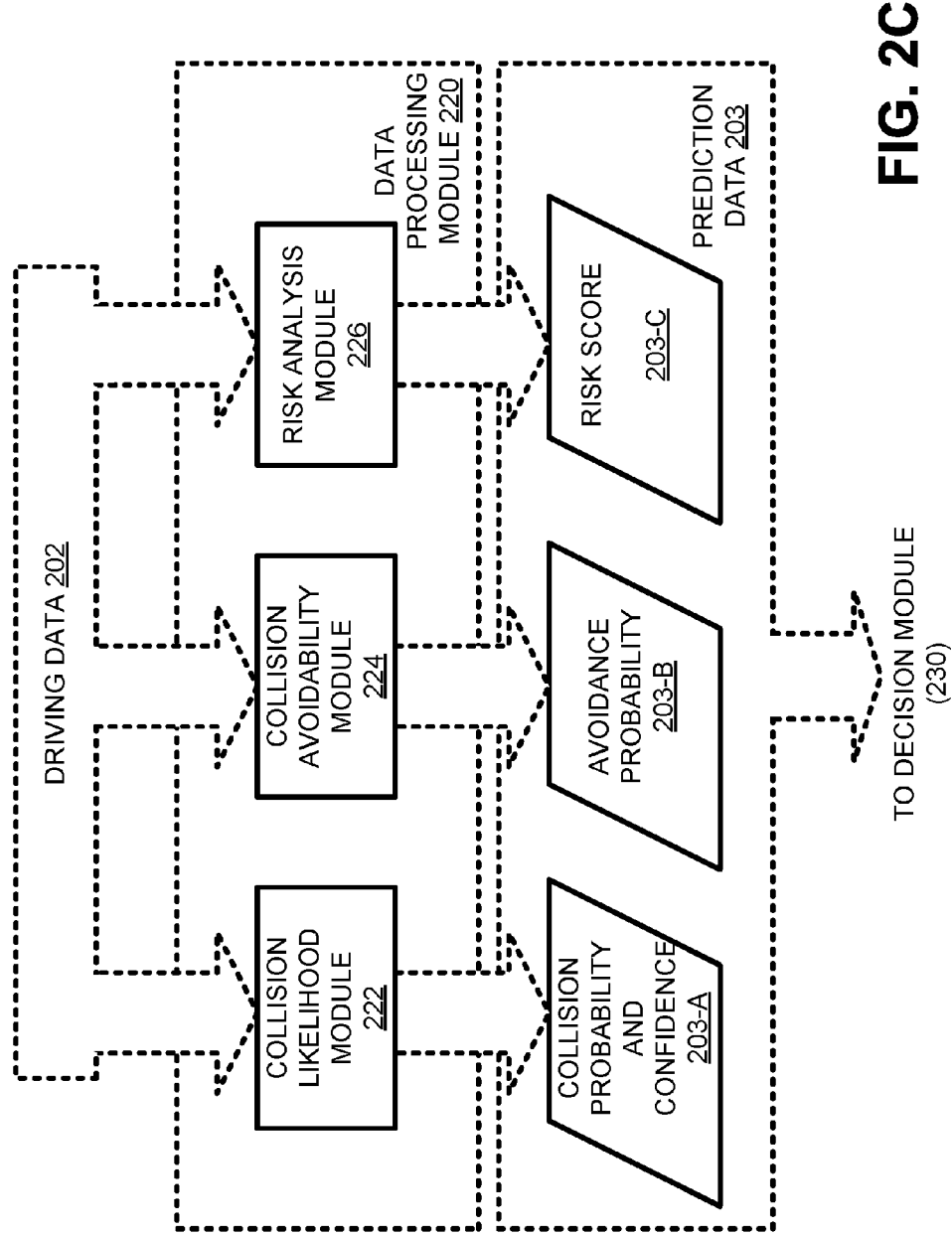

FIGS. 2A-2C are diagrams illustrating exemplary components of collision prediction unit 110. As shown in FIG. 2A, collision prediction unit 110 may include, for example, a data collection module 210 that receives and processes input data 201 to form driving data 202; a data analysis module 220 that receives analyzes driving data 202 to form prediction data 203; and a decision module 230 that processes prediction data 203 to form output data 204 that identifies a possible collision, a likelihood of the collision, and one or more possible actions that may be performed by collision avoidance unit 170 and/or the driver to prevent the collision.

As shown in FIG. 2B, data collection module 210 may include, for example, a data acquisition module 212 that collects input data 201 and a data synthesis module 214 that processes the data collected by data acquisition module 212. For example, input data 201 may include onboard sensor data 201-A, user device sensor data 201-B, external data 201-C, user data 201-D and/or historical data 201-E. Data acquisition module 212 may collect these and/or other types of input data 201 from sensor unit 120, telematics unit 130, user device 140, and/or data server 160.

In one example, data acquisition module 212 may identify conditions associated with collisions (e.g., when a collision is detected by a sensor in vehicle 101, when damage to vehicle 101 is detected, and/or when emergency service providers are contacted) or near collisions (e.g., detection of sudden braking and/or steering by vehicle 101 (events associated with detected forces that exceed a threshold), detected proximity of an object or another vehicle, etc.). Data acquisition module 212 may further identify data associated with other times when similar conditions occurred and may determine whether collisions occurred during these other times.

Data collection module 210 may collect onboard sensor data 201-A from sensor unit 120. Onboard sensor data 201-A may include, for example, data relevant to collision avoidance. For example, onboard sensor data 201—may be collected by one or more sensor units 120, such as optical or sonic proximity sensors, rangefinders, 3D-scanners, microphone arrays, video cameras, speed sensors, steering wheel orientation sensors, break or accelerator application sensors, humidity sensors, accelerometers, gyroscopes, location sensors, turn signal sensors, sensors to determine if a trailer is attached to the vehicle, and/or sensor readings that may be obtained from telematics unit 130, (e.g., from a port of an on-board diagnostic (OBD) system) such as engine rotations per minute (RPMs), transmission gear, engine temperature, or battery voltage.

Data collection module 210 may collect user device sensor data 201-B from user device 140. User device sensor data 201-B may be used to gauge driver attention, to determine if, for example, the driver is distracted. User device sensor data 201-B may relate to monitoring a driver's vital signs and may be used to determine, for example if the driver is suffering from an emergency medical condition, is under the influence of drugs or alcohol, or is drowsy.

Data collection module 210 may collect external data 201-C from data server 160 and/or a sensor external to vehicle 101. External data 201-C data may include, for example, weather information or traffic information. For example traffic cameras may be used to determine a road blockage ahead that the driver may not be able to see. Another source of external data may include be onboard a sensing unit 120, a telematics unit 130 and/or a user device 140 sensing from one or more other vehicles 101 in the vicinity of the primary vehicle 101 (e.g., a vehicle associated with collision prediction unit 110).

Data collection module 210 may collect user data 201-D from telematics unit 130 and/or user device 140. As described in greater detail below, user data 201-D may be used in collision avoidance algorithms for making more refined distinctions when avoiding collisions. User data 201-D may include, for example, the age and experience level of the driver, the historical driving patterns of the driver, the familiarity of the driver with his or her surroundings, or any known medical conditions. In another example, user data 201-D may further include data specific to vehicle 101, such as the weight, make and model, type of tires installed, or general physics governing the motion of vehicle 101.

Data collection module 210 may collect historical data 201-E from data server 160. For example, historical data 201-E may include police reports or other indicators of the number of accidents that given locations, the general historical driving behavior of the driver, and/or previously captured and stored data from any of the above data sources.

Data synthesis module 214 may perform one or more operations on input data 201 to form driving data 202. In one implementation, data synthesis module 214 may perform data cleaning to remove erroneous data included in input data 201 and/or portions of input data 201 that do not adhere to predefined standards. For example, data synthesis module 214 may perform data normalization and/or standardization in which raw data is mathematically altered to be dimensionally consistent. For example, input data 201 may be normalized using equation 1 (see below). In equation 1, a standardized input data ($x_{i,\,norm}$) is generated by subtracting a mean value ($\bar{x}$) from data $x_i$ and dividing the result by a standard deviation ($\sigma$) of the data, effectively giving the resulting standardized data a mean of zero and a standard deviation of one.

$$x_{i,norm} = (\bar{x} - x_i) \div \sigma \qquad \text{(Eq. 1)}$$

In one implementation, data synthesis module 214 may perform feature extraction, such as to convert onboard sensor data 201-A and/or user device sensor 201-B to predict future data associated with vehicle 101. For example, data synthesis module 214 may compute the rate of change of the distance between vehicle 101 and another vehicle based on other sensor data, such as data identifying previous positions and velocities of the vehicles. In another example, trends in the data may be evaluated using Markov chains and/or other statistical techniques to estimate future data associated with vehicle 101

As shown in FIG. 2C, data processing module 220 may include a collision likelihood module 222, a collision avoidability module 224, and a risk analysis module 226. Collision likelihood module 222 may process driving data 202 (e.g., from data collection module 210) to identify a probability of a collision. For example, collision likelihood module 222 may estimate collision probabilities by deterministic, heuristics-based methods, and/or stochastic methods based on historical data included in driving data 202. Heuristic methods used by collision likelihood module 222 may include, for example, pre-crash indicators associated with a distance or change in distance between the vehicle and surrounding obstacles.

When performing a stochastic-based method, collision likelihood module 222 may determine other pre-crash indicators from an analysis of driving data 202. For example collision likelihood module 222 may record and label portions of driving data 202 that correspond to a collision and/or a near collision event. Collision likelihood module 222 may add other labels to driving data 202, such as to identify portions of input data 201 associated with high acceleration events. Portions of driving data 202 that have been labeled as historical events by collision likelihood module 222 may be used to determine the probability of a future collision as collision probability and confidence 203-A. Collision probability and confidence 203-A may represent, for example, a value between 0 and 1 indicating the likelihood of a collision based on identified factors (with 1 indicating an almost certain likelihood of collision). For example, collision likelihood module 222 may determine collision probability and confidence 203-A based on summing relative changes in collision likelihoods associated with different factors, and dividing the summed relative changes in collision likelihoods by a sum of the factors to normalize the resulting value.

Table 1 shows exemplary data that may be used by collision likelihood module 222 to estimate pre-crash indicators and the probability of the collision.

TABLE 1

| Input | Variable | Training Data | | |
|---|---|---|---|---|
| | | Vehicle 1 | Vehicle 2 | Vehicle 3 |
| Vehicle tires installed | $x_1$ | All Terrain | Snow Tires | Run Flat |
| Vehicle type | $x_2$ | Truck | SUV | Car |
| Driver record | $x_3$ | Excellent | Excellent | Fair |
| Vehicle Speed | $x_4$ | 40 mph | 60 mph | 71 mph |
| Historical collisions at location | $x_5$ | None | 1.2/year | 3/year |
| Upcoming Road Conditions | $x_6$ | Clear | Loose Gravel | Possible Ice |
| Latitude | $x_7$ | 33.7550° N | 34.4550° N | 32.3450° N |
| Longitude | $x_8$ | 84.3900° W | 84.2300° W | 84.7600° W |
| Heading | $x_9$ | 34° N of E | 65° S of E | 42° E of S |
| Outcome | y | No Collision | No Collision | Collision |

As shown in Table 1, potentially relevant crash information may be provided as continuous numerical values (e.g. speed), discrete numerical values (e.g. tire width), or discrete labels (e.g. vehicle type). Various machine learning modeling approaches may be applied here to predict labels associated with outcome y from vector X={$x_1$, $x_2$, $x_3$, $x_4$, $x_5$, $x_6$, $x_7$, $x_8$, $x_9$} (in the example shown in Table 1). For example, Gaussian Processes Models, Support Vector Machines, Naïve Bayes, k-nearest neighbors, Binary Classification Trees, Binary Regression Trees, or Artificial Neural Networks, or Kernel Methods may be used to evaluate the examples shown in Table 1 to determine the outcome y. Modeling approaches may be trained to predict binary outcomes y, such as 'Collision' and 'No Collision', or may be trained to predict more nuanced metrics such as the probability of a collision, and may be further constructed to output a confidence estimate associated with the prediction.

In one example, collision likelihood module 222 may use a binary classification tree (BCT) to predict if a collection of pre-collision indications may result in a collision. A BCT may be constructed using a divide and conquer technique, in which each node of the BCT results in a binary decision. For example, each split criteria may be determined by individually considering the potential information gain resulting from each possible split, and information gain may be calculated based on entropy. The term "entropy," as used herein, may refer to Shannon entropy, and entropy may generally refer to a measure of uncertainty associated with a random variable (e.g., an amount of information that is missing or otherwise unknown). Collision likelihood module 222 may measure entropy in terms of bits using the following equation.

$$H(X) = -\sum_{x \in X} p(x) \cdot \log(p(x)) \quad \text{(Eq. 2)}$$

In equation 2, p(x) is the probability of a certain outcome (e.g., the frequency of crashes or non-crashes divided by the total number of events) for all events included in set X.

A BCT built from maximizing sequential information gain may become unwieldy and large, commonly referred to as overfitting. In one implementation, collision likelihood module 222 may mitigate overfitting by pruning, a process where nodes of the BCT are automatically removed. For example, collision likelihood module 222 may continue a pruning process until the predicted error rate for the BCT stops decreasing, the predicted error rate for the BCT decreases to a predetermined amount or percentage of all events, or the predicted error rate for the BCT decreases by a predetermined amount or percentage of all events.

Figure 3:
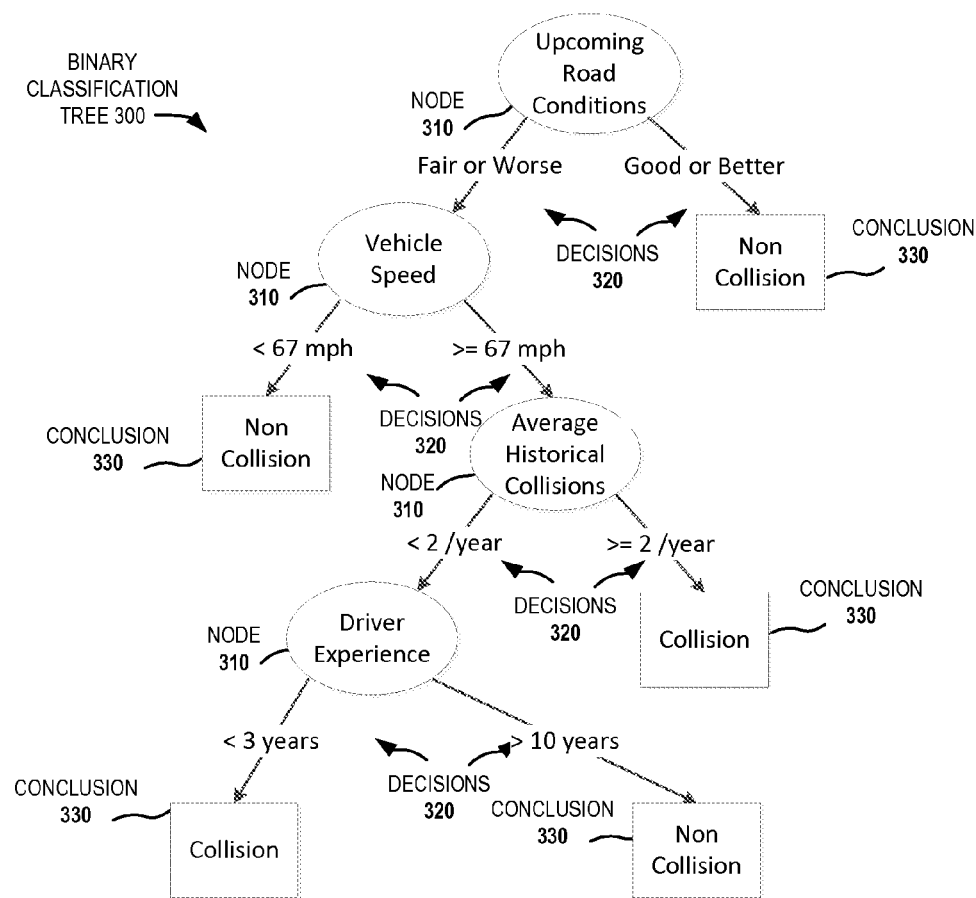
FIG. 3 depicts a binary classification tree that may be used by one or more components of the collision prediction unit shown in FIGS. 2A-2C.

FIG. 3 shows an exemplary BCT 300. As shown in FIG. 3, BCT 300 may include nodes 310 related to different conditions. The nodes 310 included in FIG. 3 include "Upcoming Road Conditions," "Vehicle Speed," "Average Historical Collisions," and "Driver Experience." Each of the nodes 310 in FIG. 3 may be associated with two different decisions 320, and each of the decisions 320 may lead to another node 310 or a conclusion 330 associated with a "Collision" result or a "Non-collision." In the exemplary BCT 300 shown in FIG. 3, a top-most node 310 entitled "Upcoming Road Conditions" has two decisions 320 indicating the upcoming road conditions node 310 may be either "Fair or Worse" or "Good or Better". When the upcoming road conditions node 310 is associated with the "Good or Better" decision 320, a "Non-collision" conclusion 330 is reached. Alternatively, when the upcoming road conditions node 310 is associated with the "Good or Better" decision 320, BCT 300 leads to additional processing related to Vehicle Speed node 310.

Referring back to FIG. 2C, data processing module 220 may further include collision avoidability module 224 that processes driving data 202 to determine avoidance probability 203-B. For example, collision likelihood module 222 may determine (e.g. based on collision conclusion 330 in BCT 300) whether a collision may occur. In these instances, collision avoidability module 224 may determine, as avoidance probability 203-B, whether collision avoidance may be performed to minimize a likelihood of a collision or to avoid the collision (e.g., as reflected in collision probability and confidence 203-A). For example, by traversing up BCT 300, collision avoidability module 224 may try to identify conditions 320 that could avoid the collision conclusion 330, and collision avoidability module 224 may identify actions associated with non-collision conclusions 330. In other examples, collision avoidability module 224 may use more deterministic approaches, such as the known or estimated physics of the vehicle to identify/determine a stopping distance, maneuverability, etc.

In one implementation, collision avoidability module 224 may determine avoidance probability 203-B by summing the likelihoods for avoiding a collision in certain conditions, and collision avoidability module 224 may adjust the likelihood for avoiding the collision based on changed conditions. The probability of avoidance generated by collision avoidability module 224 may be a number between 0 and 1, where 0 indicates that a crash cannot be avoided, and a 1 indicates that a crash will be avoided.

In certain situations, collision avoidability module 224 may determine that a collision is unavoidable and/or that collision avoidance steps, such as large changes to the direction of the vehicle, may incur more risks to the occupants of vehicle 101. In these situations, collision avoidability module 224 may identify and evaluate how to protect occupants of vehicle 101. For example, collision avoidability module 224 may identify precautionary measures, such as pre-deploying airbags, tensioning seatbelts, or alerting emergency personnel before a collision occurs. Collision avoidability module 224 may further evaluate the efficacy of the precautionary measures.

As shown in FIG. 2C, data processing module 220 may further include risk analysis module 226 that determines a risk score 203-C. Risk analysis module 226 may determine, as risk score 203-C, an expected level of risk associated with a collision (e.g., the likelihood of injury to occupants of vehicle 101, the likelihood of injury to occupants of other vehicles and/or pedestrians, and an expected amount of property damage). When determining risk score 203-C, risk analysis module 226 may take into account a number of factors that may influence the levels of risk associated with a collision and vehicle occupants. Table 2 shows exemplary factors that may be used by risk analysis module 226 to determine an overall risk score associated with a collision, such as physical metrics-related factors, occupant-related factors, and external metrics.

TABLE 2

| Physical Metrics | Occupant Related | External Metrics |
| --- | --- | --- |
| Estimated vehicle speed at time of potential collision | Age | Distance to nearest hospital |
| Nature of object that vehicle may collide with | Existing medical conditions | Proximity and availability of emergency services |
| Safety features of vehicle | Gender | |
| Angle or direction of potential collision | General health | |

Risk analysis module 226 may determine risk score 203-C to represent the potential dangers from a collision to the occupants of the vehicle. For example, risk analysis module 226 may compute an overall risk score using the following equation.

$$\text{Risk Score} = \frac{\sum_{i=1}^{N} R_i W_i}{\sum_{i=1}^{N} R_{i,max} W_i} \quad \text{(Eq. 3)}$$

In equation 3, $R_i$ represents an individual risk factor, $W_i$ represents a "weighting" assigned to each risk factor, and $R_{i,max}$ is the maximum possible value for each risk factor. Risk factor $R_i$ may be strictly positive. The denominator of equation 3 may be understood as a normalization parameter, to set the Risk Score values between 0 and 1.

Continuing with FIG. 2C, decision module 230 may receive prediction data 203 from data processing module 220. Decision module 230 may use prediction data 203 (e.g., collision probability and confidence 203-A, avoidance probability 203-B, and/or risk score 203-C) to identify one or more actions to recommend to the driver of vehicle 101 and/or to collision avoidance unit 170. For example, given a specific collision probability and confidence 203-A, avoidance probability 203-B, and/or risk score 203-C, decision module 230 may determine an appropriate response for collision avoidance, such as by mapping collision probability and confidence 203-A, avoidance probability 203-B, and/or risk score 203-C to a specific response.

In one example, decision module 230 may select from responses that are categorized into different levels. The responses may include, for example, a Level 0 response in which no action is taken to avoid a collision; a level 1 response in which a warning is provided to the driver or a passenger (e.g., a user associated with user device 140); a level 2 response which includes assuming partial control of vehicle 101; and/or a level 3 response which includes assuming the total control of vehicle 101.

In some situations, decision module 230 may decide to take no action (e.g., a Level 0 response) to prevent a collision. In such situations, for example, a collision may be relatively unlikely, or the avoidance actions may actually interfere with the ability of the driver to prevent the collision or even increase the likelihood of a collision. In one implementation, decision module 230 may further update data collection module 210 with data associated with conditions associated with a potential collision (e.g., a near miss).

In other situations, decision module 230 may decide to present a warning about a possible collision to a driver or other user (e.g., a Level 1 response). For example, decision module 230 may decide to take no specific physical action (with respect to controlling the vehicle) and, instead, inform the driver on how to best avoid a collision and/or minimize harm from the collision. For example, decision module 230 may determine that a collision would be more likely if partial or total control of vehicle 101 is assumed and, inform the driver on how to best avoid a collision and/or minimize harm from the collision. In one example, decision module 230 may provide a driver warning, which may include as audio warning presented through an audio system and/or through user device 140. The audio warning may include a beeping sound, audio cue, and/or a message that specifically identifies a potential danger, such as a verbal indication that vehicle 101 is "approaching a dangerous curve." The audio warning may also include instructions on how to avoid a potential collision. Additionally or alternatively, the driver warning may visually identify potential hazards to the driver. For example, decision module 230 may cause a laser and/or directional headlights in vehicle 101 to illuminate a potential hazard. In another example, decision module 230 may cause a heads-up display (HUD) or other user interface to present graphical data associated with a potential hazard. For example, the HUD may superimpose a partial or full image, over a windshield of vehicle 101, that identifies a potential hazard.

In other situations, decision module 230 may decide to take partial control of vehicle 101 (e.g., a Level 2 response). For example, decision module 230 may slow vehicle 101 through braking, reducing engine power, assistive steering, etc., but allow the user to maintain control over other aspects of vehicles 101. In other situations, decision module 230 may take total control of vehicle 101 (e.g., a Level 3 response). For example, decision module 230 may control the braking, the steering, and/or the acceleration of vehicle 101 when a driver is unresponsive or incapacitated or when the driver cannot respond appropriately to avoid a collision.

Additionally or alternatively, decision module 230 may identify actions to prepare vehicle 101 for an unavoidable collision, such to prepare seatbelts to engage passengers, prepare airbags for deployment, prepare brakes for activation before a collision, cut off fuel to the engine, notify emergency services, etc. In another example, decision module 230 may cause a "slow" deployment of airbags included in vehicle 101. For example, if decision module 230 determines that a collision is highly likely to occur within a certain timeframe, this information may be used to deploy airbags at a slower rate, potentially reducing a risk of airbag-induced injuries to the occupants.

In one implementation, decision module 230 may generate a response score from weighting collision probability and confidence 203-A, avoidance probability 203-B, and/or risk score 203-C using the following equation.

$$\text{Response Score} = W_c P(\text{collision}) + W_Q P(\text{avoidance}) + W_r (\text{risk score}) \quad \text{(eq. 4)}$$

In equation 4, $W_c$, $W_Q$, and $W_r$ correspond to weighting factors associated with collision probability and confidence 203-A, avoidance probability 203-B, and/or risk score 203-

C. Furthermore, P(collision) may represent the probability of a collision, and P(avoidance) may represent the probability of avoiding a collision. In this example, the response score generated by decision module 230 may represent a weighted sum representing the likelihood of an accident, chances for avoiding the accident, and the dangers associated with the accident.

In one implementation, decision module 230 may map the response score to different possible responses. For example, a thresholding system that may be used by decision module 230 to select from four different possible responses shown in table 3.

TABLE 3

| Response Score | Crash Avoidance Level |
| --- | --- |
| 0-.4 | Level 0: No action, store data |
| .41-.6 | Level 1: User warning |
| .61-.8 | Level 2: Partial vehicle control |
| .81-1 | Level 3: Total vehicle control |

In the example presented in Table 3, decision module 230 may take no action (e.g., level 0 response) if the response score is below a low threshold score of 0.4 (e.g., a collision is unlikely, easily avoided, and/or unlikely to result in any harm). If the response score is above the low threshold score (e.g., 0.4), but below an intermediate threshold score (e.g., 0.6), decision module 230 may present a user warning. If the response score is below a high threshold score (e.g., 0.8), but greater than the intermediate threshold score (e.g., 0.6), decision module 230 may take a partial control of vehicle 101. If the response score is above the high threshold score (e.g., 0.8), decision module 230 may take the full control of vehicle 101. It should be appreciated, however, that decision module 230 may use different threshold scores, select from different actions, etc. than those illustrated in table 3.

In certain implementations, decisions thresholds, such as those shown in table 3, maybe set permanently or may adaptively determined by decision module 230 in response to shifting priorities or changing situations. Furthermore, decision module 230 may use more sophisticated mappings between pre-crash indicators and response levels. For example, decision module 230 may use nonlinear functions or machine learning techniques to map pre-crash indicators to response levels while seeking to minimize an objective function (e.g., an objective function related to minimizing the number of prior crashes that may have been avoided based on different actions).

In FIGS. 2A-2C, the particular arrangement and number of components of collision prediction unit 110 are illustrated for simplicity. Furthermore, functions described as being performed by a single component in collision prediction unit 110 may be performed by multiple separate components, and functions described as being performed by multiple components in collision prediction unit 110 may be performed by fewer components.

Figure 4:
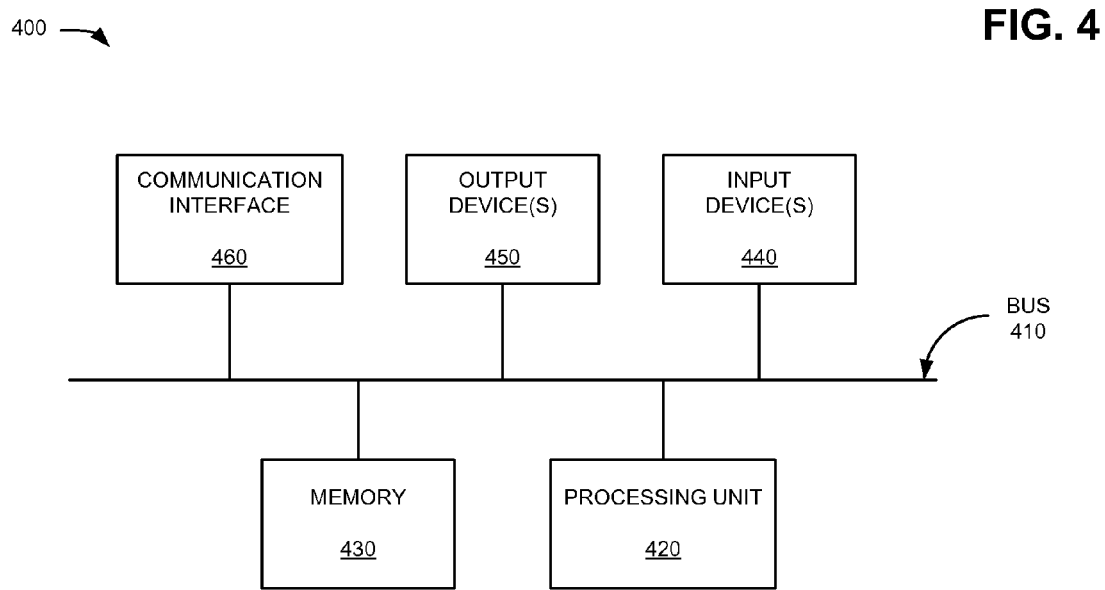
FIG. 4 depicts exemplary components of a computing unit that may be included in one or more components of the environment depicted in FIGS. 1A-1C.

FIG. 4 is a diagram illustrating exemplary components of a computing device 400. Collision prediction unit 110, sensor unit 120, telematics unit 130, user device 140, a component of network 150, and/or server device 160 may each include one or more computing devices 400. As shown in FIG. 4, computing device 400 may include, for example, a bus 410, a processing unit 420, a memory 430, one or more input devices 440, one or more output devices 450, and a communication interface 460.

Bus 410 may permit communication among the components of computing device 400. Processing unit 420 may include one or more processors or microprocessors that interpret and execute instructions. In other implementations, processing unit 420 may be implemented as, or include, one or more application specific integrated circuits (ASICs), field programmable gate arrays (FPGAs), etc.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits a user to input information to computing device 400, such as a keyboard, a keypad, a mouse, a pen, a microphone, one or more biometric mechanisms, and the like. Output device 450 may include a device that outputs information to the user, such as a display, a speaker, etc.

Communication interface 460 may include a transceiver that enables computing device 400 to communicate with other devices and/or systems. For example, communication interface 460 may include mechanisms for communicating with other devices, such as other devices of network environment 100. In one implementation, communications interface 460 may support short range wireless network communications (e.g., via Wifi® or Bluetooth® protocols). In another implementation, communications interface 460 may support long range wireless network communications (e.g., cellular network services). In other implementations, communication interface 460 may support other wired or wireless network communications.

If computing device 400 corresponds to or is included in telematics unit 130, communication interface 460 may include a physical connector interface for use with a vehicle's OBD systems. For example, the communication interface may be configured to receive diagnostic and/or control information from a vehicle's OBD system or another on-board diagnostic system. In one implementation, communication interface 460 may also receive power from the vehicle (e.g., a vehicle battery) to run telematics unit 130. Telematics unit 130 may also be directly coupled to vehicles 101's communication bus, such as when a vehicle manufacturer installs telematics unit 130 when assembling vehicle 101. In such installations, telematics unit 130 does not need to couple via an OBD-II connector. In another example, communication interface 460 of telematics unit 130 may include one or more antennas to transmit and/or receive RF signals. Communication interface 460 may, for example, exchange RF signals between telematics unit 130 and network 150.

As described herein, computing device 400 may perform certain operations in response to processing unit 420 executing software instructions stored in a computer-readable medium, such as memory 430. A computer-readable medium may include a non-transitory tangible memory device. A memory device may be implemented within a single physical memory device or spread across multiple physical memory devices. The software instructions may be read into memory 430 from another computer-readable medium or read into memory 430 from another device via communication interface 460. The software instructions stored in memory 430 may cause processing unit 420 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 4 shows exemplary components of computing device 400, in other implementations, computing device 400 may include fewer components, different components, differently-arranged components, or additional components than those depicted in FIG. 4. As an example, in some implementations, a display may not be included in computing device 400. In these situations, computing device 400 may be a "headless" device that does not include input device 440. Alternatively, or additionally, one or more components of computing device 400 may perform one or more other tasks described as being performed by one or more other components of computing device 400.

Figure 5:
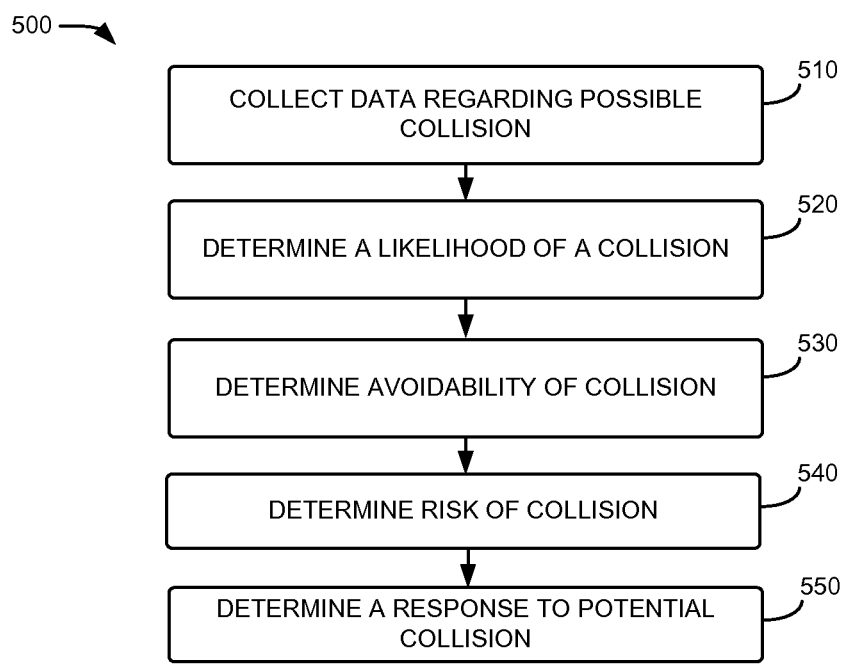
FIG. 5 depicts a flow chart of exemplary process for predicting a collision in the environment shown in FIGS. 1A-1C.

FIG. 5 is a flow chart of an exemplary process 500 for calculating a risk of a collision to vehicle 101 based on one or more conditions associated with vehicle 101. In one implementation, process 500 may be performed by collision prediction unit 110. In other implementations, process 500 may be performed by one or more other devices of environment 100, such as sensor unit 120, telematics unit 120, user device 140, and/or collision avoidance unit 170. Process 500 is described with reference to components of collision prediction unit 110 shown in FIGS. 2A-2C.

As shown in FIG. 5, process 500 may include collecting data regarding a possible collision involving vehicle 101 (block 510). For example, input data 201 may include onboard sensor data 201-A, user device sensor data 201-B, external data 201-C, user data 201-D and/or historical data 201-E. Data acquisition module 212 may collect these and/or other types of input data 201 from sensor unit 120, telematics unit 130, user device 140, and/or data server 160. In one implementation, block 510 may include data cleaning (e.g., by data synthesis module 214) to remove erroneous data included in input data 201 and/or portions of input data 201 that do not adhere to predefined standards.

As shown in FIG. 5, process 500 may further include determining a likelihood of a collision (block 520), determining an avoidability of the collision (block 530), and/or determining a risk associated with the collision (block 540).

In block 520, collision likelihood module 222 may estimate collision probabilities by deterministic, heuristics-based methods, and/or stochastic methods based on historical data included in driving data 202. Collision likelihood module 222 may determine other pre-crash indicators from an analysis of input data 202. For example, collision likelihood module 222 may record and label portions of input data 202 that correspond to a collision and/or a near collision event. Collision likelihood module 222 may add other labels to driving data 202, such as to identify portions of input data 201 associated with high acceleration events. Portions of driving data 202 that have been labeled as historical events by collision likelihood module 222 may be used to determine the probability of a future collision as collision probability and confidence 203-A. Collision likelihood module 222 may determine collision probability and confidence 203-A based on summing relative changes in collision likelihoods associated with different factors, and the dividing the summed relative changes in collision likelihoods associated with different factors by a sum of the factors to normalize the resulting value.

In block 530, collision avoidability module 224 may process driving data 202 to determine avoidance probability 203-B. For example, collision likelihood module 222 may determine whether a collision may occur and may determine, as avoidance probability 203-B, whether collision avoidance steps may be taken to minimize a likelihood or avoid the collision (e.g., as reflected in collision probability and confidence 203-A). In one implementation, collision avoidability module 224 may determine avoidance probability 203-B by summing the likelihoods for avoiding a collision under certain conditions, and collision avoidability module 224 may adjust the likelihood for avoiding the collision based on changing the conditions.

In block 540, risk analysis module 226 may determine, as risk score 203-C, an expected risk associated with a collision (e.g., the likelihood of injury to occupants of vehicle 101, the likelihood of injury to occupants of other vehicles and/or pedestrians, and an expected amount of property damage). When determining risk score 203-C, risk analysis module 226 may consider at a number of factors that may influence the levels of risk associated with a collision and vehicle occupants.

As shown in FIG. 5, process 500 may further include determining a response to a potential collision (block 550). For example, decision module 230 may use prediction data 203 (e.g., collision probability and confidence 203-A, avoidance probability 203-B, and/or risk score 203-C) to identify one or more actions to recommend to the driver of vehicle 101 and/or to collision avoidance unit 170. For example, given a specific collision probability and confidence 203-A, avoidance probability 203-B, and/or risk score 203-C, decision module 230 may determine an appropriate response level for collision avoidance, such as by mapping prediction data 203 to possible responses. For example, decision module 230 may generate a response score from collision probability and confidence 203-A, avoidance probability 203-B, and/or risk score 203-C and may select an action based on the resulting response score. For example, decision module 230 may determine whether the take no action, warn the driver, take partial control of vehicle 101, and/or take total control of vehicle 101.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 5, the order of the blocks in process 500 may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method comprising:
   collecting, by a processor, information identifying one or more conditions associated with a vehicle, wherein the information includes first data associated with the vehicle, second data associated with a driver of the vehicle, and third data associated with an environment associated with the vehicle;
   determining, by the processor and based on the collected information, a likelihood of a collision involving the vehicle, wherein determining the likelihood of the collision includes:
      identifying one or more events associated with other collisions or near-collisions,
      identifying a plurality of conditions associated with the one or more events,
      generating, based on the identified conditions, a binary classification tree (BCT) including nodes associated with the identified conditions and decisions associated with each of the nodes, and
      determining the likelihood of the collision based on a conclusion that is reached using the BCT;
   determining, by the processor and based on the collected information, a likelihood of avoiding the collision;
   determining, by the processor and based on the collected information, a risk associated with the collision;
   selecting, by the processor, an action to perform based on at least one of the likelihood of the collision, the likelihood of avoiding the collision, and the risk associated with the collision; and
   causing, by the processor, the action to be performed.

2. The method of claim 1, wherein collecting the information includes:
   acquiring at least a portion of the first data from a telematics unit associated with the vehicle.

3. The method of claim 1, wherein collecting the information includes:
   acquiring at least a portion of the second data from a user device associated with at least one of the driver or a passenger in the vehicle.

4. The method of claim 1, wherein collecting the information includes acquiring the third data from at least one of:
   an optical proximity sensor,
   sonic proximity sensor,
   a rangefinder,
   a 3D-scanner,
   a microphone,
   a video camera,
   a speed sensor,
   a steering wheel orientation sensor,
   a break or accelerator application sensor,
   a humidity sensor,
   an accelerometer,
   a gyroscope,
   a geographic location sensor,
   a turn signal sensor, or
   a trailer attachment sensor.

5. The method of claim 1, wherein determining the likelihood of avoiding the collision includes:
   identifying a modification to the one or more conditions to form a modified set of conditions; and
   determining the likelihood of avoiding the collision based on frequencies that the modified set of conditions occur in the identified one or more events.

6. The method of claim 1, wherein selecting the action includes:
   determining a response score based on a weighted sum of the likelihood of the collision, the likelihood of avoiding the collision, and the risk associated with the collision; and
   selecting the action from a plurality of actions based on the response score.

7. The method of claim 6, wherein the plurality of actions includes:
   storing at least a portion of the collected data when the response score is less than a first threshold;
   presenting a warning to the driver when the response score is greater than the first threshold and less than a second threshold that is greater than the first threshold;
   assuming partial control of the vehicle when the response score is greater than the second threshold and less than a third threshold that is greater than the first threshold and the second threshold; and
   assuming total control of the vehicle when the response score is greater than the third threshold.

8. The method of claim 1, wherein the action includes preparing the vehicle for the collision, wherein preparing the vehicle for the collision includes modifying an operation of the vehicle to reduce the risk associated with the collision.

9. A device comprising:
   a memory configured to store instructions; and
   a processor configured to execute one or more of the instructions to
      collect information identifying one or more conditions associated with a vehicle, wherein the information includes first data associated with the vehicle, second data associated with a driver of the vehicle, and third data associated with an environment associated with the vehicle;
      determine, based on the collected information, a likelihood of a collision involving the vehicle, wherein when determining the likelihood of the collision the processor is configured to execute the one or more of the instructions to:
         identify one or more events associated with other collisions or near-collisions,
         identify a plurality of conditions associated with the one or more events,
         generate, based on the identified conditions, a binary classification tree (BCT) including nodes associated with the identified conditions and decisions associated with each of the nodes, and
         determine the likelihood of the collision based on a conclusion that is reached using the BCT;
      determine, based on the collected information, a likelihood of avoiding the collision;
      determine, based on the collected information, a risk associated with the collision;
      select an action to perform based on at least one of the likelihood of the collision, the likelihood of avoiding the collision, and the risk associated with the collision.

10. The device of claim 9, wherein the processor, when collecting the information, is further configured to execute the one or more instructions to:
   acquire at least a portion of the first data from a telematics unit associated with the vehicle.

11. The device of claim 9, wherein the processor, when collecting the information, is further configured to execute the one or more instructions to:
   acquire at least a portion of the second data from a user device associated with at least one of the driver or a passenger in the vehicle.

12. The device of claim 9, wherein the processor, when collecting the information, is further configured to execute the one or more instructions to:
   acquire at least a portion of the third data from a data server that is remote from the vehicle, wherein the third data relates to conditions regarding a route being traversed by the vehicle.

13. The device of claim 9, wherein the processor, when determining the likelihood of avoiding the collision, is further configured to execute the one or more instructions to:
   identify a modification to the one or more conditions to form a modified set of conditions; and
   determine the likelihood of avoiding the collision based on occurrences of the modified set of conditions in the identified one or more events.

14. A non-transitory computer readable medium to store instruction, the instructions comprising:
   one or more instructions that, when executed by a processor, cause the processor to:
      collect information identifying one or more conditions associated with a vehicle, wherein the information includes first data associated with the vehicle, second data associated with a driver of the vehicle, and third data associated with an environment associated with the vehicle;
      determine, based on the collected information, a likelihood of a collision involving the vehicle, wherein when determining the likelihood of the collision the processor is configured to:
         identify one or more events associated with other collisions or near-collisions,
         identify a plurality of conditions associated with the one or more events,
         generate, based on the identified conditions, a binary classification tree (BCT) including nodes associated with the identified conditions and decisions associated with each of the nodes, and
         determine the likelihood of the collision based on a conclusion that is reached using the BCT;
      determine, based on the collected information, a likelihood of avoiding the collision;
      determine, based on the collected information, a risk associated with the collision;
      select an action to perform based on at least one of the likelihood of the collision, the likelihood of avoiding the collision, and the risk associated with the collision.

15. The non-transitory computer readable medium of claim 14, wherein the first data is collected from a telematics unit, and wherein the first data includes at least one of a vehicle speed, a fuel level, an engine temperature, intake manifold pressure, tire pressure, or coolant temperature.

16. The non-transitory computer readable medium of claim 14, wherein the second data is collected from a user device associated with at least one of the driver or a passenger in the vehicle, and wherein the second data includes at least one of:
   an attention level of the driver,
   a gender of the driver,
   an age of the driver,
   an amount of time the driver has driven during a time period,
   a time of day when the second data is collected,
   a vehicle type associated with the driver,
   a driving experience level of the driver,
   a historical driving pattern of the driver,
   a familiarity of the driver with a geographic location associated with the vehicle, or
   a medical condition associated with the driver.

17. The non-transitory computer readable medium of claim 14, wherein the third data is acquired from at least one of:
   an optical proximity sensor,
   sonic proximity sensor,
   a rangefinder,
   a 3D-scanner,
   a microphone,
   a video camera,
   a speed sensor,
   a steering wheel orientation sensor,
   a break or accelerator application sensor,
   a humidity sensor,
   an accelerometer,
   a gyroscope,
   a geographic location sensor,
   a turn signal sensor, or
   a trailer attachment sensor.

18. The non-transitory computer readable medium of claim 14, wherein when selecting the action the processor is configured to:
   determine a response score based on a weighted sum of the likelihood of the collision, the likelihood of avoiding the collision, and the risk associated with the collision; and
   select the action from a plurality of actions based on the response score.

19. The non-transitory computer readable medium of claim 18, wherein the plurality of actions includes:
   storing at least a portion of the collected data when the response score is less than a first threshold;
   presenting a warning to the driver when the response score is greater than the first threshold and less than a second threshold that is greater than the first threshold;
   assuming partial control of the vehicle when the response score is greater than the second threshold and less than a third threshold that is greater than the first threshold and the second threshold; and
   assuming total control of the vehicle when the response score is greater than the third threshold.

20. The non-transitory computer readable medium of claim 14, wherein the action includes preparing the vehicle for the collision, wherein when preparing the vehicle for the collision the processor is configured to modify an operation of the vehicle to reduce the risk associated with the collision.

* * * * *